United States Patent

[11] 3,557,996

| [72] | Inventors | William Henry Campbell<br>Newcastle upon Tyne;<br>John Antony Pennell, Cumberland,<br>England |
|---|---|---|
| [21] | Appl. No. | 746,623 |
| [22] | Filed | July 22, 1968 |
| [45] | Patented | Jan. 26, 1971 |
| [73] | Assignee | Vickers Limited<br>London, England<br>a British company |
| [32] | Priority | July 21, 1967 |
| [33] | | Great Britain |
| [31] | | 33,785/67 |

[54] HIGH-PRESSURE VESSELS
9 Claims, 3 Drawing Figs.

[52] U.S. Cl.................................................. 220/46,
72/272, 72/710
[51] Int. Cl........................................................ B65d 53/00
[50] Field of Search............................................ 72/60, 253,
270, 272; 220/46, (Inquired); 287/126; 217/110

[56] References Cited
UNITED STATES PATENTS

| 2,690,939 | 10/1954 | Whaley | 220/46 |
| 3,144,162 | 8/1964 | Morris | 220/46 |
| 3,258,151 | 6/1966 | Gasche | 220/46 |
| 3,379,043 | 4/1968 | Fuchs, Jr. | 72/60 |

Primary Examiner—Richard J. Herbst
Attorney—Pennie, Edmonds, Morton, Taylor and Adams ABSTRACT: A high-pressure vessel having a borelike high-pressure cavity with an outwardly flared open end closable by a plug and a seal assembly inserted into the open cavity end. This seal assembly incorporates an outer ring with a lipped leading end and a frustoconical outer surface, which ring can be wedged into the flared cavity around the plug, and inner sealing ring means embracing the plug within the outer ring lip.

INVENTORS
WILLIAM HENRY CAMPBELL
JOHN ANTONY PENNELL
BY
Rennie, Edmonds, Morton, Taylor & Adams
ATTORNEYS

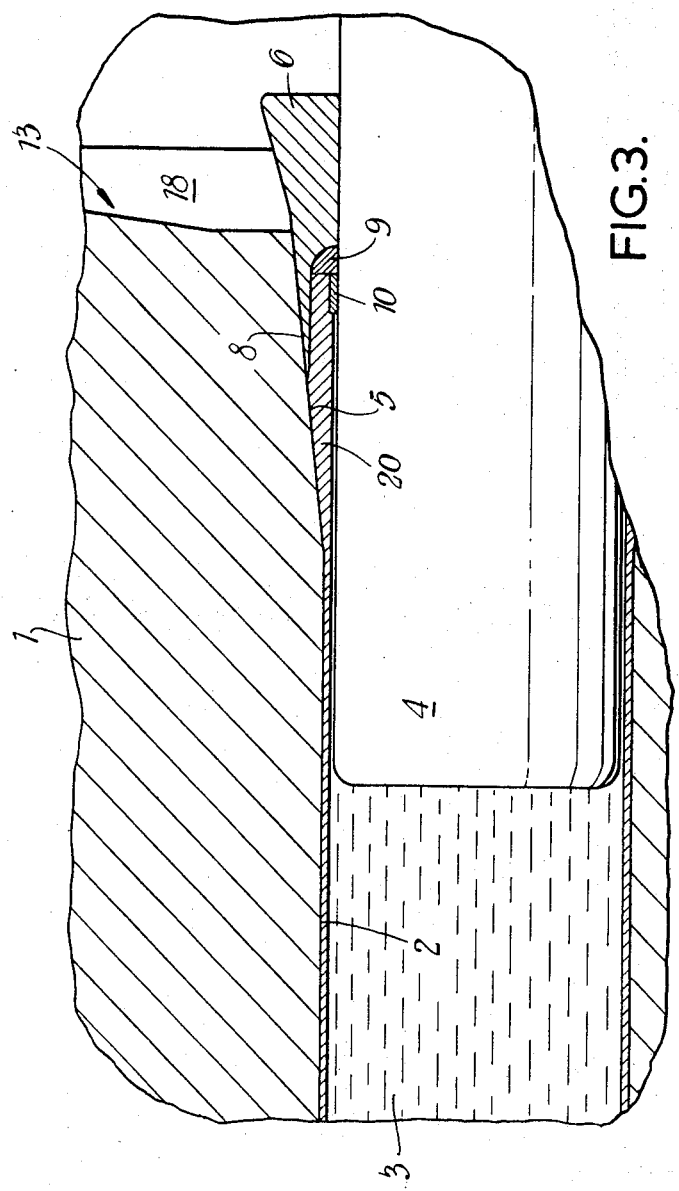

HIGH-PRESSURE VESSELS

This invention relates to high pressure vessels and is concerned mainly with the sealing of such vessels.

BACKGROUND OF INVENTION

The chief difficulty encountered in the design of commercial high-pressure equipment, e.g. hydrostatic extrusion, is the provision of high-pressure containers capable of withstanding repeated applications of the working pressure. Frequently, these pressures are only just within the capabilities of plain cylindrical vessels, so that regions of stress concentration within the vessel cannot be tolerated. To prevent damage to a bore of the vessel by scoring, it is advisable to employ static seals mounted in the vessel for pressuring plungers which project into the bore, rather than moving seals mounted on the nose of the plunger. These seals cannot be simply mounted in a groove in the vessel because of the stress concentration that would result. The use of a simple cylindrical sleeve which projects into the bore, surrounding the plunger, and supporting the seal at its inner end, is also undesirable because of the necessarily reduced plunger diameter to accommodate the radial seal thickness.

It is accordingly an object of the invention to provide a high-pressure vessel having improved means for sealing a high-pressure bore in the vessel.

SUMMARY OF THE INVENTION

The foregoing and other objects are accomplished by providing a high-pressure vessel having a wall part defining a bore which opens through at least one end of the vessel to constitute a high-pressure cavity for the vessel, an outwardly flared portion of said wall part defining the open end of said bore, a plug removably inserted into said flared bore end partially to close the latter, and a seal assembly removably inserted into said flared bore end to seal between the bore and the plug, said seal assembly incorporating an outer ring having a lipped leading end with a frustoconical outer surface which can be wedged into said flared bore end around said plug and further incorporating inner sealing ring means which embraces said plug within the confines of the outer ring lip. The seal assembly described is particularly effective in that it allows full use to be made of the available borelike cavity diameter, that is the plunger used to pressurize the vessel can be nominally the same diameter, while no appreciable stress concentrations are introduced into the vessel to cause a reduction in its fatigue strength. The seal is also particularly easy to remove for inspection. In one embodiment, the seal assembly also incorporates an integral protection sleeve to prevent access of high-pressure fluid to the surface of the borelike cavity of the vessel. In certain cases, this has been shown to increase substantially the fatigue strength of the vessel.

BRIEF DESCRIPTION OF THE DRAWINGS

Other objects, features and advantages of the invention will become obvious when taken in conjunction with the accompanying drawings in which:

FIG. 3 is an alternative embodiment of a seal assembly in a high-pressure vessel.

DESCRIPTION OF THE PREFERRED EMBODIMENTS

Figure 1:
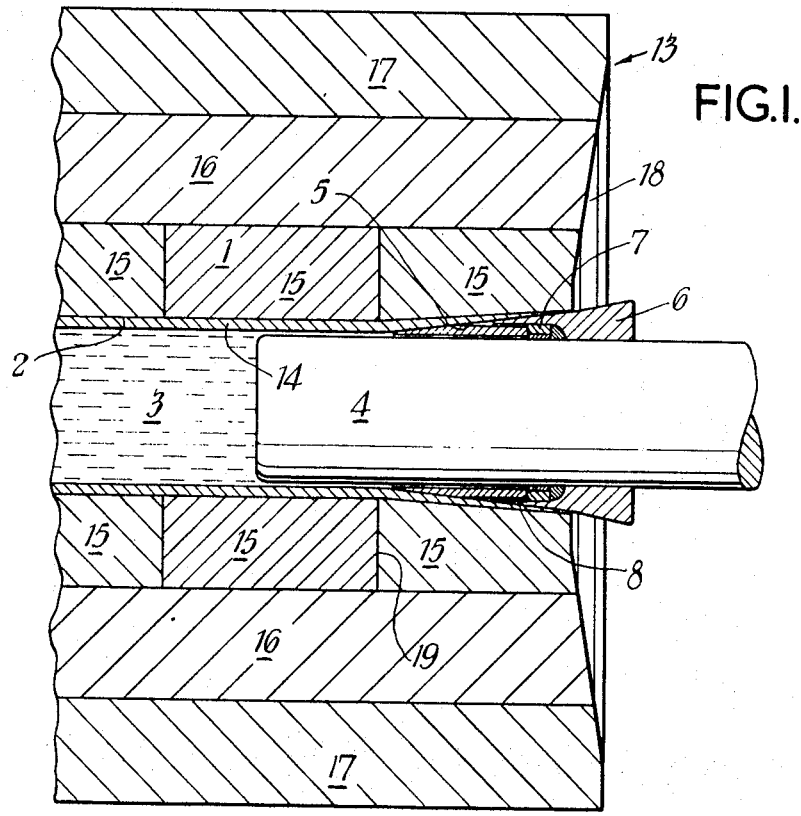
FIG. 1 shows one embodiment of a seal assembly in a segmented high-pressure vessel.

Referring now to FIG. 1 a high-pressure cylindrical vessel of thick-walled construction 1 is shown therein with a borelike cavity 2 hereinafter referred to as the vessel bore for containing a pressure fluid 3. Projecting into at least one open end of the vessel is a plug formed as a plunger 4. This plug may be secured against movement in the bore 2 or as in this case may be a plunger and seal assembly similar to that shown in FIG. 1, or may be fitted with an extrusion die or other effective closure.

The plunger 4 is a clearance fit, within a thin inner liner 14 in the bore 2, thereby minimizing the "dead" volume within the vessel bore. Near the end of the bore 2 through which the plunger 4 projects the bore is outwardly flared to form a tapering part-conical surface 5 of small included angle. The cylindrical bore 2 and this surface 5 merge smoothly to give rise to a negligible stress concentration in the vessel.

In the tapering annular space between the plunger 4 and the flared surface 5 of the vessel bore is housed a seal assembly consisting of an outer ring 6 and inner sealing ring means generally indicated at 7. The outer ring 6 has a frustoconical outer surface which can be wedged in the flared bore surface 5 and an inner diameter which is a close sliding fit on the plunger 4. The ring 6 is supported against the outward pressure reaction by any suitable supporting structure outside the vessel and not shown in the FIGS. The supporting structure is conveniently as described in the present applicants' copending Pat. application Ser. No. 748,053, filed Jul. 26, 1968, now U.S. Pat No. 3,467,273 for "Improvements relating to the sealing of high-pressure vessels." This supporting structure must keep the ring 6 at all times wedged firmly into the flared bore surface 5. The leading end of the outer ring 6 is counterbored to accommodate the inner sealing ring means 7 and forms an outer lip 8 which projects beyond the inner ring means 7 into the vessel. This lip is urged outwardly against the flared bore surface 5 by pressure of the fluid in the bore 2 and serves to prevent escape of the fluid past the outside of the outer ring 6.

The sealing ring means 7 will now be described with reference to FIG. 2, in which the liner 14 is omitted. This sealing ring means incorporates a mitre ring 9 of approximately quadrant-shaped cross section, which engages with the curved internal shoulder of the counterbore in the outer ring 6. The ring 9 forms an antiextrusion ring for the sealing ring proper which comprises a thin friction ring 10 of synthetic plastics material such as polytetrafluorethylene or other suitable material, backed up by a pressure ring 11 of rectangular section. made of rubber or like material. These components can be axially located in the borelike cavity by abutment shoulder means formed either by a suitable circlip, or by a tapered sleeve 12 which is inserted into the bore 2 against the surface 5 before installing the seal assembly. This sleeve 12 may be made be made of metal, rubber or any other suitable material.

The curved profile at the base of the counterbore in the outer ring 6 against which mitre ring 9 rests is designed to minimize the stress concentrations in the ring 6 at the change of section. Because of the very high axial-compressive stresses in the outer ring 6 at the working pressure, and the fact that it is constrained radially by the vessel bore, the tensile hoop stresses set up in it are much smaller than those in the vessel wall and partially counteracted by the effect of wedging it into the flared surface part 5 of the bore 2. Thus in spite of the stress concentration due to the counterbore, fatigue failure is unlikely. However, in the event of failure, the outer ring 6 which is a small component is easily replaced without damage to the vessel.

An important aspect of the invention is the way in which the stress distribution within the vessel 1 is modified to minimize the effect of the flared surface part 5 of the bore 2. The mean diameter of the surface 5 is greater than that of the parallel-sided bore 2, so that the surface area exposed to the pressure fluid for unit axial length is also greater. Thus the outward radial pressure force acting over the length of the flared surface 5 is greater than it would be if the bore were cylindrical throughout. Since it is not convenient to increase the outside diameter of the vessel 1 in proportion near its ends, this increased pressure force would give rise to localized higher stresses in the vessel. This would be particularly serious if the vessel were of segmented construction since the segments would not then be in radial equilibrium near the seal under the action of purely radial stresses, and axial tensile stresses would arise near the bore.

Figure 2:
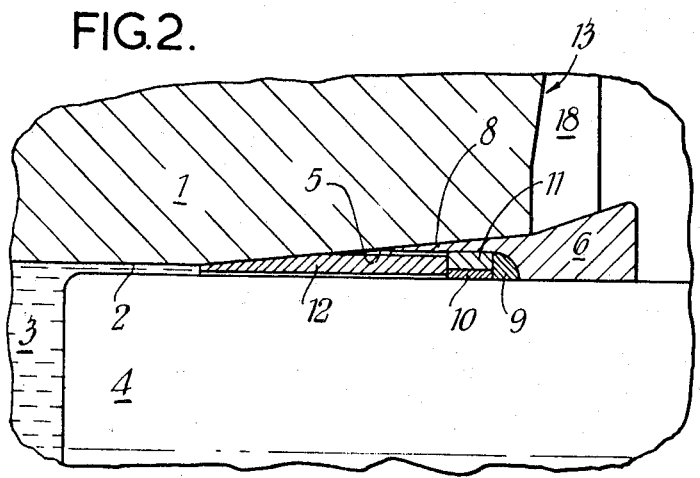
FIG. 2 is a view to an enlarged scale of a detail of FIG. 1, with a part shown in FIG. 1 omitted for clarity.

The technique by which this effect can be overcome is shown in FIGS. 1 and 2. In each case, an end face 13 of the vessel 1 is formed into a shallow part-conical recess 18, so that the increased outward radial load acting over the flared bore surface 5 is distributed axially as well as radially through the vessel wall to give a sensibly uniform stress distribution throughout the vessel length at all radii greater than the radius of the periphery of the recess 18. At the periphery of the conical recess 18, the stresses and strains are thus virtually identical with those at the same radius within the body of the vessel. In the case of the vessel of multilayered wall construction shown in FIG. 1, the vessel comprises the thin inner liner 14, supported by axially stacked rings of sector-shaped blocks or segments 15, 16 etc., which in turn are supported by an outer container 17. The inner limit of the flared bore surface is conveniently located at a joint 19 between the first and second rings of inner segments 15 if these are, in fact, split into several rings as shown, while the outer periphery of the recess 18 can also be located within this ring of segments. Thus only one ring of segments 15 at each end of the vessel need by nonstandard.

The liner 14 of high-strength material may conveniently have a smaller taper on its outside diameter, where it registers with the end ring of segments 15, than on the inside, where it registers with the outer ring 6 or alternatively may have a parallel cylindrical outer surface. In this way, the axial stresses in the liner are supported by the outer ring of the seal assembly and any tendency for the liner to extrude axially in very high-pressure applications is prevented.

A further embodiment of the invention is shown in FIG. 3. A pressure vessel and outer ring are utilized as in the previous embodiments but in this case part of the seal assembly is elongated to form a sheath which covers the entire bore surface to protect it from damage due to mechanical abrasion, or penetration of high-pressure fluid. The sealing ring means, as before, incorporates a friction ring 10 of polytetrafluoroethylene and a mitre ring 9, acting as an antiextrusion device for the ring 10. The ring 10 is seated in one end of a hard rubber or plastic sheathlike sleeve 20 which is moulded to fit closely the parallel and flared bore parts 2 and 5 of the vessel, and which projects into the outer ring counterbore at the end of the vessel to abut against the mitre ring 9. The inner surface of the sleeve 20 is a clearance fit on the plunger 4 except near the end where it is recessed to provide a seating for the disc 10. No retaining sleeve 12 is necessary as in the previous embodiments as the abutment shoulder or end face on the sleeve or liner 20 performs this function, as well as positively sealing the leakage path around the outer ring past the lip 8. Since there is no sliding contact between this liner and the plunger, it can remain permanently in place without wear, it only being necessary to replace the mitre ring 9 (by removing the outer ring) or the friction ring 10 which can be replaced after withdrawal of the plunger. In the event of wear of the liner 20, the thin cylindrical portion can be made replaceable by allowing it to partially overlap the tapered end piece, to which it can be bonded with a suitable adhesive. As in the previous embodiments the outer ring 6 is supported in the bore 2 against outward pressure reaction, by a supporting structure such as previously referred to.

While there have been shown and described preferred embodiments, it is to be understood that various adaptations can be made without departing from the spirit and scope of the invention.

We claim:

1. A high-pressure vessel having a wall part defining a bore which opens through at least one end of the vessel to constitute a high-pressure cavity for the vessel, said wall part having an outwardly flared portion defining the open end of said bore to provide a flared bore end, a plug removably inserted into said flared bore end partially to close the latter, and a seal assembly removably inserted into said flared bore end to seal between the bore and the plug, said seal assembly incorporating an outer ring having a lipped leading end with a frustoconical outer surface which can be wedged into said flared bore end around said plug, an inner sealing ring means which embraces said plug and is encircled by said outer ring lip, and facing abutment shoulder means provided in axially space relationship respectively around said plug and around the inside of said lipped outer ring between which shoulder means said inner sealing ring means is axially located.

2. A high-pressure vessel according to claim 1 in which said sealing ring means includes a mitre ring of approximately quadrant-shaped cross section, which mitre ring has a curved surface for bearing against a correspondingly curved surface provided on said outer ring, inside shoulder means, and further includes a thin friction ring or synthetic plastics material.

3. A high-pressure vessel according to claim 2, including a liner in the form of a sleeve fitted in the bore around the inner wall surface of the wall part defining said bore.

4. A high-pressure vessel according to claim 3, wherein the abutment shoulder means provided around said plug is constituted by an end face of the liner.

5. A high-pressure vessel according to claim 4, wherein the portion of the liner immediately adjacent said end face is shaped to fit within the lipped leading end of the outer ring so that said end face is disposed to abut the mitre ring, and wherein said liner end face is formed with a recess opening therethrough for seating said friction ring so that the friction ring is backed up and supported by the liner.

6. A high-pressure vessel having a wall part defining a bore which opens through at least one end of the vessel, to constitute a high-pressure cavity for the vessel, said wall part having an outwardly flared portion defining the open end of said bore, a plug removably inserted into said flared bore end partially to close the latter, a seal assembly removably inserted into said flared bore end to seal between the bore wall and the plug, said seal assembly axially between the tapered sleeve and the internal shoulder in the outer ring.

7. A high-pressure vessel having a wall part of multilayer construction defining a bore which opens through at least one end of the vessel, to constitute a high-pressure cavity for the vessel, said wall part having an outwardly flared portion defining the open end of said bore, a plug removably inserted into said flared bore end partially to close the latter, a seal assembly removably inserted into said flared bore end to seal between the bore wall and the plug, said seal assembly incorporating an outer ring having a lipped leading end with a frustoconical outer surface which embraces said plug inside the lip provided by the lipped leading end of the outer ring, a shallow part-conical recess provided concentrically in the vessel end face, through which recess the flared bore end opens, said recess ensuring that radial loads acting, during vessel operation, on the outwardly flared portion of said wall part defining the open end of said bore are distributed axially and radially through the vessel wall part, to give a sensibly uniform stress distribution throughout the vessel length at all radii greater than the radius of the periphery of said recess.

8. A high-pressure vessel according to claim 6 in which the said outer ring internal shoulder has a curved surface and in which the sealing ring means includes a mitre ring of approximately quadrant-shaped cross section, which has a curved surface corresponding to that of the outer ring internal surface against which it is disposed to bear, a thin friction ring of synthetic plastics material fitted around the plug, and an elastomeric pressure ring fitted around the said friction ring between an inner surface of the outer ring lip and an outer surface of the friction ring to back up the latter.

9. A high-pressure vessel according to claim 1, wherein the plug is a plunger which is arranged to be axially slidable into and out of the vessel cavity through said outer ring an and sealing ring means.

PO-1050
(5/69)

UNITED STATES PATENT OFFICE
CERTIFICATE OF CORRECTION

Patent No. 3,557,996          Dated January 26, 1971

Inventor(s) William Henry Campbell and John Antony Pennell

It is certified that error appears in the above-identified patent and that said Letters Patent are hereby corrected as shown below:

Column 1, line 16, change "pressuring" to --pressurizing--.

Column 2, line 38, change "polytetrafluorethylene" to --polytetrafluoroethylene--.

Column 3, line 20, change "by" to --be--.

Column 4, line 36, (Claim 6, line 8) after "assembly", inse --incorporating an outer ring having a lipped leading end with a frusto-conical outer surface which can be wedged into said flared bore end around said plug, an internal shoulder provided in the outer ring lip, said seal assembly further incorporating a tapered sleeve removably fitted in the flared bore end around the plug and extending at least partially within the outer ring lip, and an inner sealing ring means embracing the plug inside the outer ring lip and located--.

Column 4, line 47, (Claim 7, line 10) after "surface", inse --which can be wedged into said flared bore end around said plug and further incorporating inner sealing ring means--

Signed and sealed this 10th day of October 1972.

(SEAL)
Attest:

EDWARD M.FLETCHER,JR.          ROBERT GOTTSCHALK
Attesting Officer          Commissioner of Patent